UNITED STATES PATENT OFFICE.

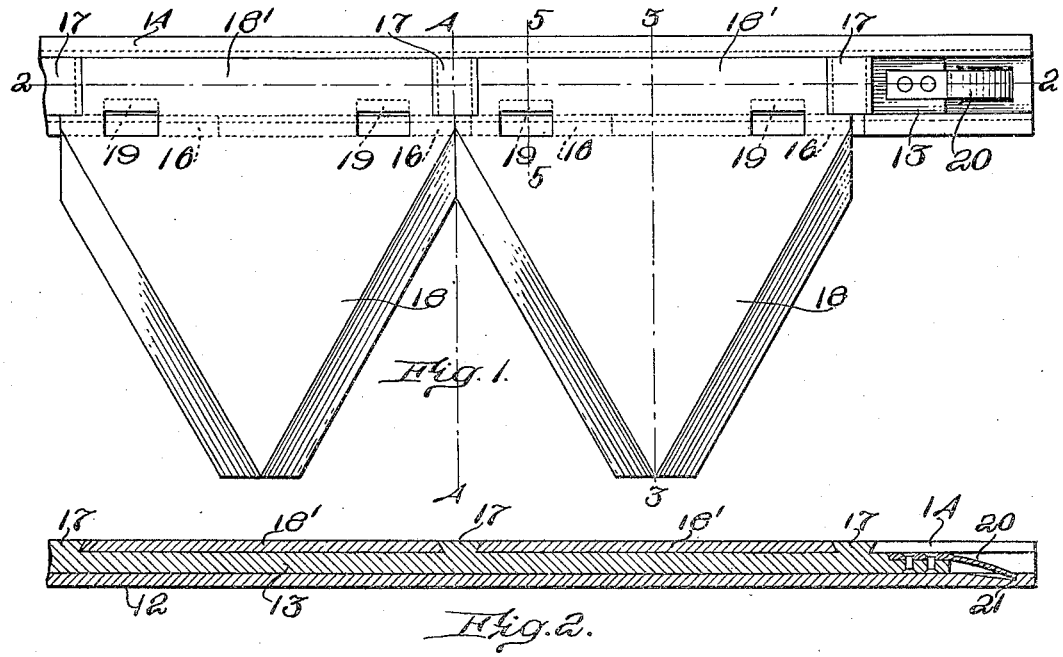
J. H. POOLE & A. D. ABBENZELLER.
CUTTER BAR FOR MOWING MACHINES.
APPLICATION FILED MAR. 2, 1909.
953,711. Patented Apr. 5, 1910.

JOHN H. POOLE, OF BROCKTON, AND ALFRED D. ABBENZELLER, OF RANDOLPH, MASSACHUSETTS, ASSIGNORS, BY MESNE ASSIGNMENTS, TO BROCKTON MOWING MACHINE CUTTER BAR COMPANY, OF BROCKTON, MASSACHUSETTS, A CORPORATION OF MASSACHUSETTS.

CUTTER-BAR FOR MOWING-MACHINES.

953,711.     Specification of Letters Patent.     Patented Apr. 5, 1910.

Application filed March 2, 1909. Serial No. 480,948.

*To all whom it may concern:*

Be it known that we, JOHN H. POOLE, of Brockton, in the county of Plymouth, State of Massachusetts, and ALFRED D. ABBEN-ZELLER, of Randolph, in the county of Norfolk and State of Massachusetts, have invented certain new and useful Improvements in Cutter-Bars for Mowing-Machines, of which the following is a specification.
This invention has for its object to enable the knives of a mowing machine or reaper cutter bar to be conveniently and expeditiously removed from the cutter bar for grinding or renewal, and securely reattached thereto without the use of special tools, and without injury to any of the parts.

The invention consists in the improvements which we will now proceed to describe and claim.
Of the accompanying drawings, forming a part of this specification,—Figure 1 represents a top plan view of a portion of a mowing machine cutter bar and its knives, embodying our invention. Fig. 2 represents a section on line 2—2 of Fig. 1. Fig. 3 represents a section on line 3—3 of Fig. 1. Fig. 4 represents a section on line 4—4 of Fig. 1. Fig. 5 represents a section on line 5—5 of Fig. 1. Fig. 6 represents a view similar to Fig. 5 showing the knife free to be removed from the cutter bar. Fig. 7 represents a perspective view of a portion of the body member of the cutter bar. Fig. 8 represents a perspective view of a portion of the top or movable member of the cutter bar.

The same reference characters indicate the same parts in all the figures.

In carrying out our invention, we provide a cutter bar and a series of knives mounted thereon, the bar and knives having complemental coupling members and means for locking the coupling members simultaneously in inseparable engagement with each other, so far as accidental separation is concerned, and releasing said members simultaneously from the inseparable engagement to permit the removal of either or all of the knives, so that all the knives, by a single movement, may be rendered separable from the cutter bar, and by another movement rendered inseparable.

The preferred embodiment of our invention shown in Figs. 1 to 8, inclusive, shows the cutter bar composed of a body member or section 12, and a movable or top section 13 which is movable longitudinally relatively to the body member, and is adapted to occupy a projected position to cause an inseparable connection between the knives, hereinafter described, and the cutter bar; and to a retracted position to permit the separation of the knives from the cutter bar. The body member 12 is provided with longitudinal guides 14 and 15, the inner sides of which are beveled so that they collectively form a dovetail way in which the correspondingly dovetailed member 13 is adapted to slide. The outer guide 15 is interrupted at intervals to form channels 16 which are arranged to permit the endwise movement of the knives when the movable member 13 is retracted, as hereinafter described. The movable member 13 is provided with transverse projections 17 on its upper surface, said projections having dovetailed edges and being adapted to engage the beveled ends of the shank portions 18' of the knives 18, as indicated in Fig. 2, the dovetailed sides of the projections 17 holding down the knife shanks, and preventing the removal of the knives from the cutter bar by sidewise upward movement.

Each knife is provided with one or more, and preferably two projections 19 which may be formed integral with the knife shanks and formed by partially detaching portions of the metal of said shanks, and bending said portions downwardly, as shown in Figs. 5 and 6, the ears 19 being inclined in such manner that they are adapted to engage the inclined inner side of the outer guide 15. The projections 19 are so formed and arranged that when the movable member 13 is projected, or in its normal operative relation to the body member 12, the projections engage portions of the outer guide 15 between the channels 16, as shown in Fig. 5, so that the knives are prevented by the outer guide from being moved endwise out of engagement with the cutter bar. When, however, the movable member 13 is retracted or moved to the right from the position shown in Figs. 1 and 2, the projections register with passages 16 in the outer guide, as shown in Fig. 6, and are adapted to pass through said passages so that when the member 13 is retracted, the knives are all free to be withdrawn from the cutter bar by an endwise movement. It follows, therefore, that either or each of the knives may be removed from the cutter bar when the member 13 is retracted. Provision is thus made for conveniently and quickly permitting the separation of the knives from the cutter bar so that they may be ground independently, and then returned to place on the cutter bar, after which they may be quickly and conveniently locked to the cutter bar inseparably against accidental displacement by the return or projection of the member 13 to the position shown in Figs. 1, 2, and 5.

It will be seen that the inclination of the projections 19 enables them to be interlocked with the guide 15 in such manner that the guide coöperates with the transverse projections 17 in preventing sidewise upward movement of the knives. The inner guide 14 is preferably higher than the outer guide 15, so that its upper portion serves as a stop or abutment for the knife shanks 18′, and prevents backward endwise movement of the knives beyond a predetermined point.

Any suitable means may be provided for locking the movable member 13 in its projected position, the means here shown including a spring-locking tongue 20 attached to the member 13, and a notch 21 formed in the body member 12, and adapted to engage the tongue 20 to prevent the retraction of the member 13, as shown in Figs. 1 and 2.

We have not shown the finger-bar nor the means for reciprocating the cutter bar and knives, and it will be understood that in these respects the construction may be of the usual or any suitable character.

In the construction shown in Figs. 1 to 8, inclusive, the inclined outer sides of the projections 19 on the knives and the correspondingly inclined inner side of the guide 15 engaging said projections, enable the guide to exert a holding down action on the knives at points between the ends of their shanks, thus materially increasing the stability of the knives.

We claim:—

1. A cutter bar composed of a body member having longitudinal guides, the outer one of which is interrupted to form lateral passages communicating with the space between the guides, and a top member movably engaged with said guides and provided with transverse knife engaging shoulders, combined with a series of knives, the shank portions of which are formed to engage said shoulders to prevent sidewise displacement of the knives, and are provided with projections which are adapted to pass through the passages in the outer guide so that the knives are separable from the cutter bar by an outward endwise movement when the movable member is retracted to cause said projections and passages to coincide, the movable member being movable to separate the projections from the passages and cause the intermediate portions of the outer guide to engage the projections and prevent endwise displacement of the knives.

2. A cutter bar composed of a body member having longitudinal guides, the outer one of which is interrupted to form lateral passages communicating with the space between the guides, and a top member movably engaged with said guides and provided with transverse knife-engaging shoulders, combined with a series of knives, the shank portions of which are formed to engage said shoulders to prevent sidewise displacement of the knives and are provided with projections which are adapted to pass through the passages in the outer guide when the movable member is retracted, and are confined by the portions of the outer guide between the said passages when the movable member is projected, and means for confining the movable member in its projected position.

3. A cutter bar composed of a base member having an inner and an outer longitudinal guide, the outer guide having transverse passages, and a movable member slidingly engaged with the said guides and provided with means for engaging the edges of a series of knife shanks and with recesses to receive projections on said shanks.

In testimony whereof we have affixed our signatures, in presence of two witnesses.

JOHN H. POOLE.
ALFRED D. ABBENZELLER.

Witnesses:
C. F. BROWN,
P. W. PEZZETTI.